(12) United States Patent
McGill

(10) Patent No.: US 12,081,814 B2
(45) Date of Patent: Sep. 3, 2024

(54) DISTRIBUTED ACCESS CONTROL FOR MULTIMEDIA CONTENT

(71) Applicant: DISH Network L.L.C., Englewood, CO (US)

(72) Inventor: Blake McGill, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 100 days.

(21) Appl. No.: 17/558,266

(22) Filed: Dec. 21, 2021

(65) Prior Publication Data
US 2023/0199236 A1 Jun. 22, 2023

(51) Int. Cl.
| | |
|---|---|
| *H04L 9/32* | (2006.01) |
| *H04L 9/08* | (2006.01) |
| *H04N 21/239* | (2011.01) |
| *H04N 21/4784* | (2011.01) |
| *H04N 21/6334* | (2011.01) |
| *H04L 9/00* | (2022.01) |

(52) U.S. Cl.
CPC ....... *H04N 21/2396* (2013.01); *H04L 9/0825* (2013.01); *H04L 9/321* (2013.01); *H04L 9/3236* (2013.01); *H04N 21/4784* (2013.01); *H04N 21/6334* (2013.01); *H04L 9/50* (2022.05)

(58) Field of Classification Search
CPC ........... H04N 21/2396; H04N 21/4784; H04N 21/6334; H04L 9/0825; H04L 9/321; H04L 9/3236; H04L 9/50
See application file for complete search history.

(56) References Cited

U.S. PATENT DOCUMENTS

| | | | |
|---|---|---|---|
| 8,272,066 B2 | 9/2012 | Pal | |
| 2009/0288109 A1* | 11/2009 | Downey | H04N 21/44224 |
| | | | 725/23 |
| 2013/0004142 A1* | 1/2013 | Grab | H04N 5/913 |
| | | | 386/E5.028 |
| 2019/0207768 A1* | 7/2019 | Hardy | H04L 63/0823 |
| 2019/0327509 A1* | 10/2019 | Lenhart | H04N 21/2543 |
| 2021/0099535 A1* | 4/2021 | Assadipour | H04L 9/3239 |
| 2023/0325473 A1* | 10/2023 | Buffard | H04L 9/3239 |
| | | | 713/155 |

FOREIGN PATENT DOCUMENTS

GB 2559592 A * 8/2018 ............. G06Q 20/06

* cited by examiner

*Primary Examiner* — Jefferey F Harold
*Assistant Examiner* — Alexander Boyd
(74) *Attorney, Agent, or Firm* — Perkins Coie LLP

(57) ABSTRACT

The present disclosure is directed to methods and systems for controlling access to multimedia content. In an access control system, each device operates as a gateway or node in the access control network and is linked to the other devices in the access control network. Each device in the network has a hash value that identifies the device and the type of media content or content providers the device can access. When a device requests to access media content, nodes in the access control system can compare the hash value of the user device to hash values in an allocation table to determine whether the user is authorized access the media content. In some implementations, a device connected to the access control network can verify or validate the hash value of the requesting device by comparing the hash value to hash values in an allocation table stored on a blockchain.

18 Claims, 7 Drawing Sheets

DISTRIBUTED ACCESS CONTROL FOR MULTIMEDIA CONTENT

TECHNICAL FIELD

The present disclosure is related to the fields of digital rights management and media content access control.

BACKGROUND

Presently, accessing media content is not secure. Most media content delivery platforms utilize simple username/password security features, and few implement a second authorization step, such as an identity verification question. In the context of accessing media content (e.g., streaming services, cable program packages, etc.), some malicious hackers have been able to alter their own media content access settings, such as by hacking into the digital rights management software interface and adjusting their subscription/package level to receive additional programming that the malicious actor has not paid for. In these types of situations, the media content provider may not always be able to detect such malicious actions. As such, there is an increased need for enhanced security and authorization methods for the delivery of media content.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

The techniques introduced here may be better understood by referring to the following Detailed Description in conjunction with the accompanying drawings, in which like reference numerals indicate identical or functionally similar elements.

DETAILED DESCRIPTION

Figure 1:
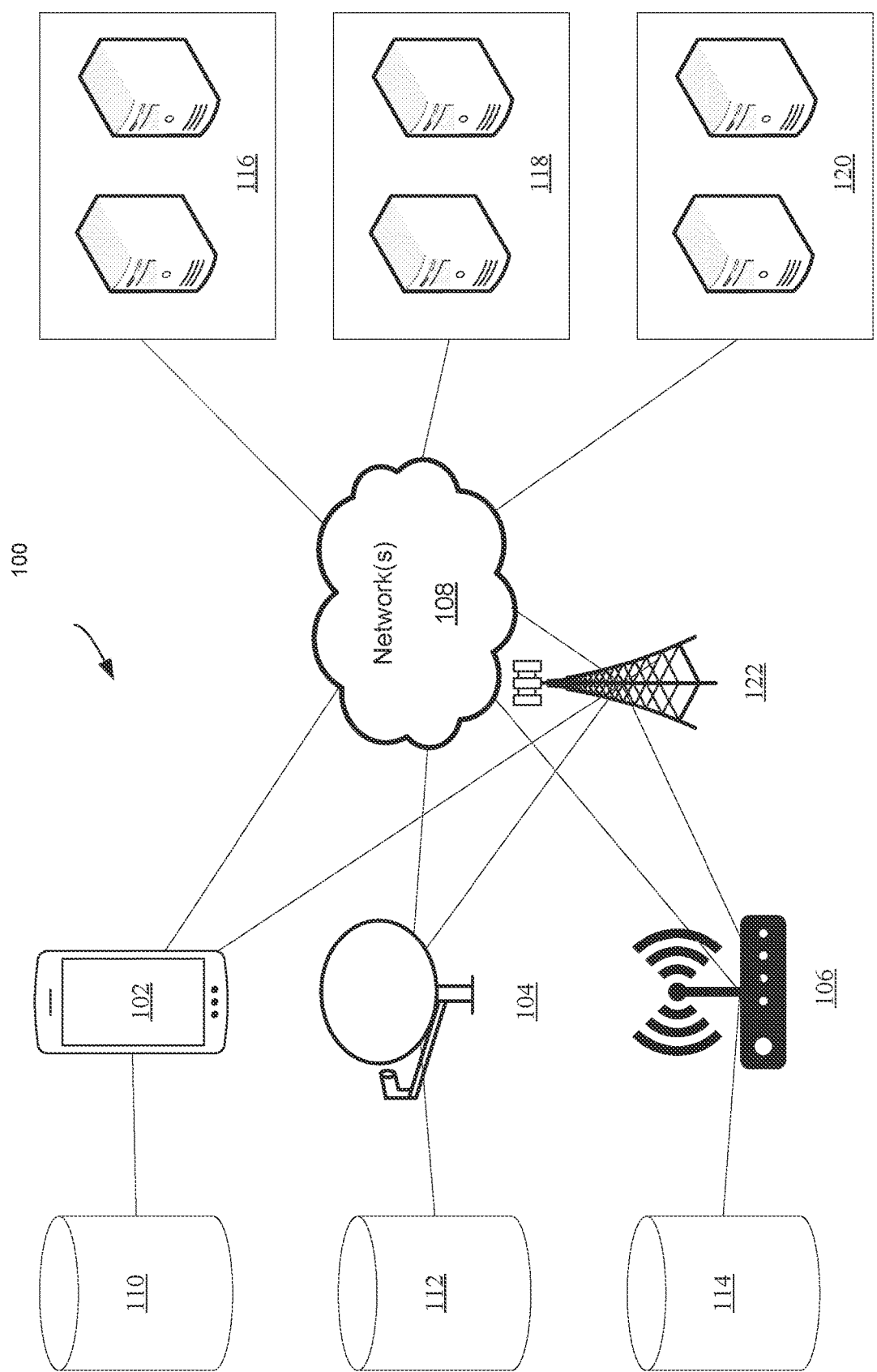
FIG. 1 illustrates an example of a distributed system for controlling access to multimedia content.

Aspects of the present disclosure are directed to methods and systems for controlling access to multimedia content via a distributed network of users. An access control system can connect to various devices (e.g., set-top-box devices, smartphones, tablets, smart TVs, etc.). In the access control system, each device acts as a gateway or node in the access control network and is linked to the other devices in the access control network. Each device in the network has a token with an associated hash value that identifies the device and the type of media content (e.g., channels, videos, or videos based on subscriptions) and/or content providers (e.g., Hulu™, Netflix™, HBO™, XFinity™, etc.) the user can access. When a user requests access to media content, the access control system can compare the hash value of the user device to hash values in an allocation table to determine whether the user can access the media content. In some examples, the allocation table is maintained in a central database owned by the multimedia content provider. In other implementations, the allocation table may be distributed across various users in an access control network. For example, a device connected to the access control network (e.g., a set-top box (STB) in the network) can verify or validate the hash value of the requesting device (i.e., the user's device) by comparing the hash value to hash values in the allocation table that the user's device has stored. After the device performs the verification of the requesting device, the access control system can provide the device with a reward (e.g., subscription discount, cryptocurrency, etc.). Additional users (i.e., nodes) in the access control network may maintain a local copy of the allocation table and also verify a user's access to multimedia content and channels. Once a certain consensus of nodes has verified a user's access to the multimedia content, the user's access may be verified across the access control system. The certain consensus of nodes may be a predetermined consensus threshold value, such as four or six or ten, or any value the system deems appropriate for verification purposes.

The access control system can use blockchain technology to generate an identity token (e.g., hash value) for a user device using a cryptographic one-way hash of information that uniquely identifies the device. Tokens also have an owner that uses an additional public/private key pair. The owner public key is set as the token owner identity and when performing actions against tokens, ownership proof is established by providing a signature generated by the owner private key and validated against the public key listed as the owner of the token. This allows transactions of media content, such as media content requested by owners of unique tokens, to be accurately tracked using blockchain transactions.

The blockchain technology can maintain a distributed ledger (e.g., allocation table) of transactions and generate an identity token for a user device using a cryptographic one-way hash of information that uniquely identifies the device. Tokens also have an owner that uses an additional public/private key pair. The owner public key is set as the token owner identity and when performing actions against tokens, ownership proof is established by providing a signature generated by the owner private key and validated against the public key listed as the owner of the token. A device (set-top-box, smart TV, etc.) can be uniquely identified, for example, using the name of its manufacturer and its serial number. The identity tokens for each would be a cryptographic one-way hash of such combinations.

In existing access control systems, the systems can only verify user credentials (e.g., username or password). In the present embodiments, the access control system verifies the user device connected to the network using blockchain technology. Thus, the present embodiment improves the security of the user account and protects the user from malicious activity.

FIG. 1 illustrates an example of a distributed system for controlling access to multimedia content. Example system 100 presented is a combination of interdependent components that interact to form an integrated whole for authorizing devices to access multimedia content. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to generate hash values, validate hash values, request, stream, retrieve, and store media content. In one example, a client device 102 may be a mobile phone, a client device 104 may be a smart OTA antenna, and a client device 106 may be a broadcast module box (e.g., set-top box). In other example aspects, client device 106 may be a gateway device that is in communication with other gateway devices and multimedia content providers. Other possible client devices include but are not limited to tablets, personal computers, televisions, etc. In aspects, a client device, such as client devices 102, 104, and 106, may be equipped to access and/or locally store an allocation table and verify/validate a hash value associated with a device requesting media content. In other aspects, a client device, such as client devices 102, 104, and 106, may request access to media content and submit a hash value to be verified/validated. Client devices 102, 104, and 106, may be equipped to receive live requested content data. The signals that client devices 102, 104, and 106 may receive may be transmitted from satellite broadcast tower 122 and/or network(s) 108. Broadcast tower 122 may also be configured to communicate with network(s) 108, in addition to being able to communicate directly with client devices 102, 104, and 106. In some examples, a client device may be a set-top box that is connected to a display device, such as a television (or a television that may have set-top box circuitry built into the television mainframe).

Client devices 102, 104, and 106 may be configured to run software that allows for a user to access to multimedia content, as well as an allocation table. The media content and/or allocation table may be stored locally on the client device or accessed remotely via network(s) 108. For example, a client device may receive a signal from broadcast tower 122 containing the media content. The signal may indicate the user requested media content. The client device may receive this user request and subsequently store the request locally in databases 110, 112, and/or 114. In alternative scenarios, the user requested content data may be transmitted from a client device (e.g., client device 102, 104, and/or 106) via network(s) 108 to be stored remotely on server(s) 116, 118, and/or 120. A user may subsequently access the media content data from a local database (110, 112, and/or 114) and/or external database (116, 118, and/or 120), depending on where the media content data may be stored. The system may be configured to receive and process user requested content data in the background.

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to check for the media content data from a channel from an OTA antenna (e.g., antenna 104). A graphical user interface may display on the mobile device 102 indicating the media content search results of certain local channels. Specifically, at a particular geolocation, the antenna 104 may receive signals from broadcast tower 122. The antenna 104 may then transmit those signals for analysis via network(s) 108. The results of the analysis may then be displayed on mobile device 102 via network(s) 108. In other examples, the results of the analysis may be displayed on a television device connected to a broadcast module box, such as broadcast module box 106.

In other examples, databases stored on remote servers 116, 118, and 120 may be utilized to assist the system in identifying the user requested media content. Such databases may contain certain media content data such as video titles, actors in movies, video genres, etc. Such data may be transmitted via network(s) 108 to client devices 102, 104, and/or 106 to assist in identifying user requested media content. Because broadcast tower 122 and network(s) 108 are configured to communicate with one another, the systems and methods described herein may be able to identify requested media content in different sources, such as streaming services, local and cloud storage, cable, satellite, or OTA.

In some examples client devices 102, 104, and 106 may each have a local copy of an allocation table stored in local databases 110, 112, and/or 114. In other example aspects, the client devices 102, 104, and 106 may access a remotely-stored allocation table via network(s), wherein the allocation table may be stored on remote server(s) 116, 118, and/or 120.

Figure 2:
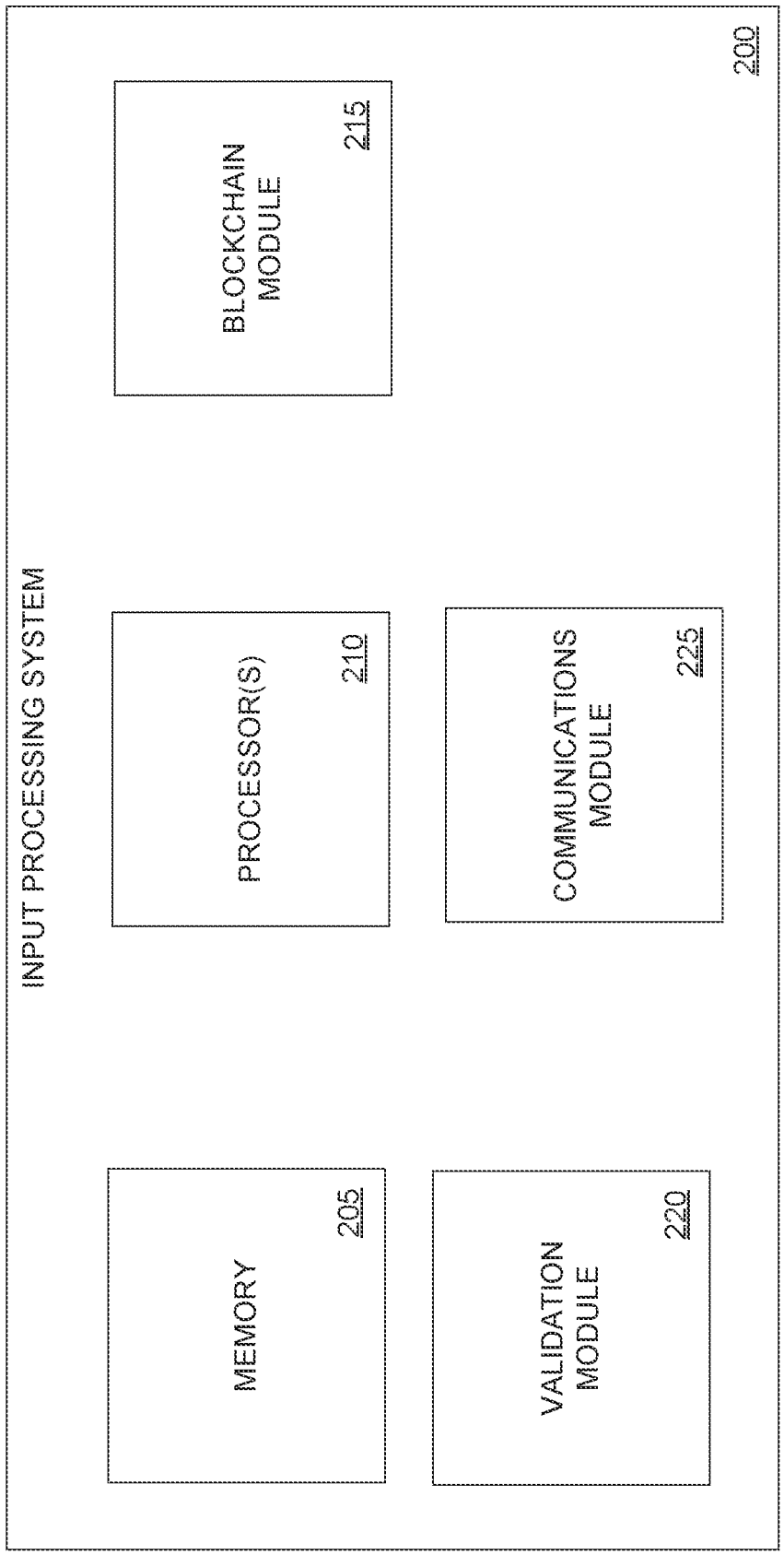
FIG. 2 illustrates an example input processing system for implementing systems and methods for controlling access to multimedia content.

FIG. 2 illustrates an example input processing system for implementing systems and methods for authorizing access to multimedia content. The input processing system (e.g., one or more data processors) is capable of executing algorithms, software routines, and/or instructions based on processing data provided by a variety of sources related to authorizing access to multimedia content. The input processing system can be a general-purpose computer or a dedicated, special-purpose computer. According to the embodiments shown in FIG. 2, the disclosed system can include memory 205, one or more processors 210, blockchain module 215, validation module 220, and communications module 225. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of blockchain module 215, validation module 220, and communications module 225. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one database containing user requested media content information (e.g., audio or video data), a hash value associated with a device, or an allocation table with hash values.

Blockchain module 215 provides blockchain functionality for the system. The blockchain module 215 allows for the creation of a new block for a new/existing blockchain distributed ledger, hashing of the new block, and addition of the new block to the user's private blockchain and distributed ledger (e.g., allocation table). Examples of hash functions include different types of Secure Hash Algorithms (SHA-1, SHA-2, or SHA-3) or a Jenkins hash function. The blockchain module 215 can manage a plurality of public blockchains, private blockchains, and/or other distributed ledgers for users. In some implementations, the privacy of each user's blockchain(s) can be ensured because each user maintains an individual blockchain and/or ledger for the user's data. In other implementations, transactions include a public key that matches a private key associated with the user. In these implementations, while the transactions are added to a public ledger, details of the transactions can only be accessed when the private key is used, ensuring user data privacy.

Blockchain module 215 is further configured to add new blocks to the blockchain when a user changes his/her subscription. For instance, if a user upgrades their subscription, then new access control permissions may be granted. These new access control systems may need to be recorded on a blockchain so future nodes participating in the access control network can successfully and accurately validate the user's newly acquired access. In another example, a user may downgrade their plan, and their subscription plans will change accordingly. Similarly, users on the system may verify what the user may or may not view based on the updated subscription data recorded on the blockchain.

Validation module 220 can receive a hash value (e.g., of a token), identifying a device requesting access to media content, and compare the hash value to hash values in an allocation table to determine whether the user is authorized to access the media content. Communications module 225 is associated with sending/receiving information (e.g., media content information or device information from blockchain module 215 and validation module 220) with a remote server or with one or more client devices, streaming devices, OTA boxes, set-top boxes, etc. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 225 sends validation information identified by the validation module 220. Furthermore, communications module 225 may be configured to communicate media content data to a client device and/or OTA box, smart OTA antenna, and/or smart TV, etc.

Figure 3:
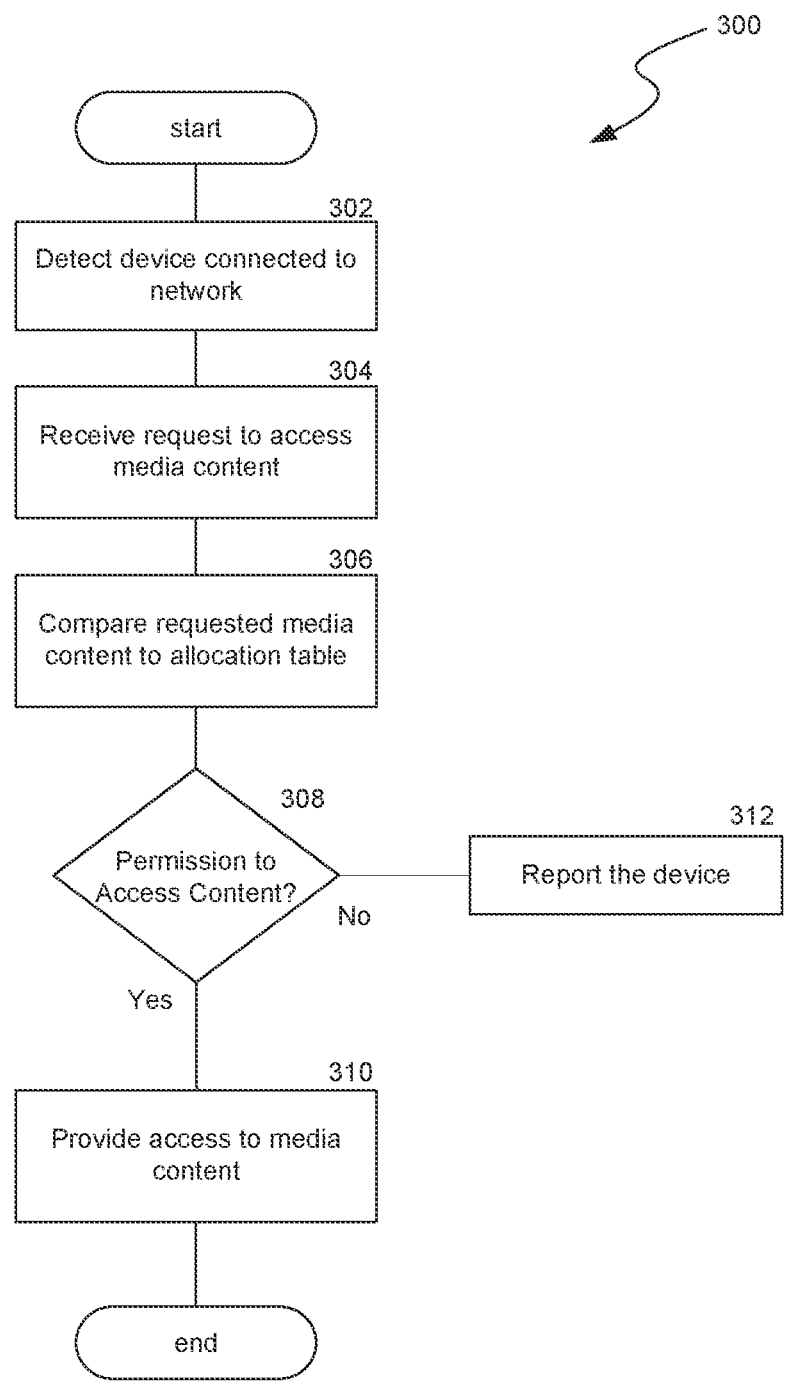
FIG. 3 is a flow diagram illustrating a process used in some implementations for controlling access to multimedia content.

FIG. 3 is a flow diagram illustrating a process 300 used in some implementations for authorizing access to multimedia content. In some implementations, process 300 is triggered by a user requesting media content (e.g., movie, TV show, song, etc.), a device connecting to an access control network, a user activating a subscription, powering on a device, a device connecting to a gateway (e.g., router), or the user downloading an authorization application on a device. In various implementations, process 300 is performed locally on the user device or performed by cloud-based device(s) that can support identifying a user device so a user can access media content.

Figure 5:
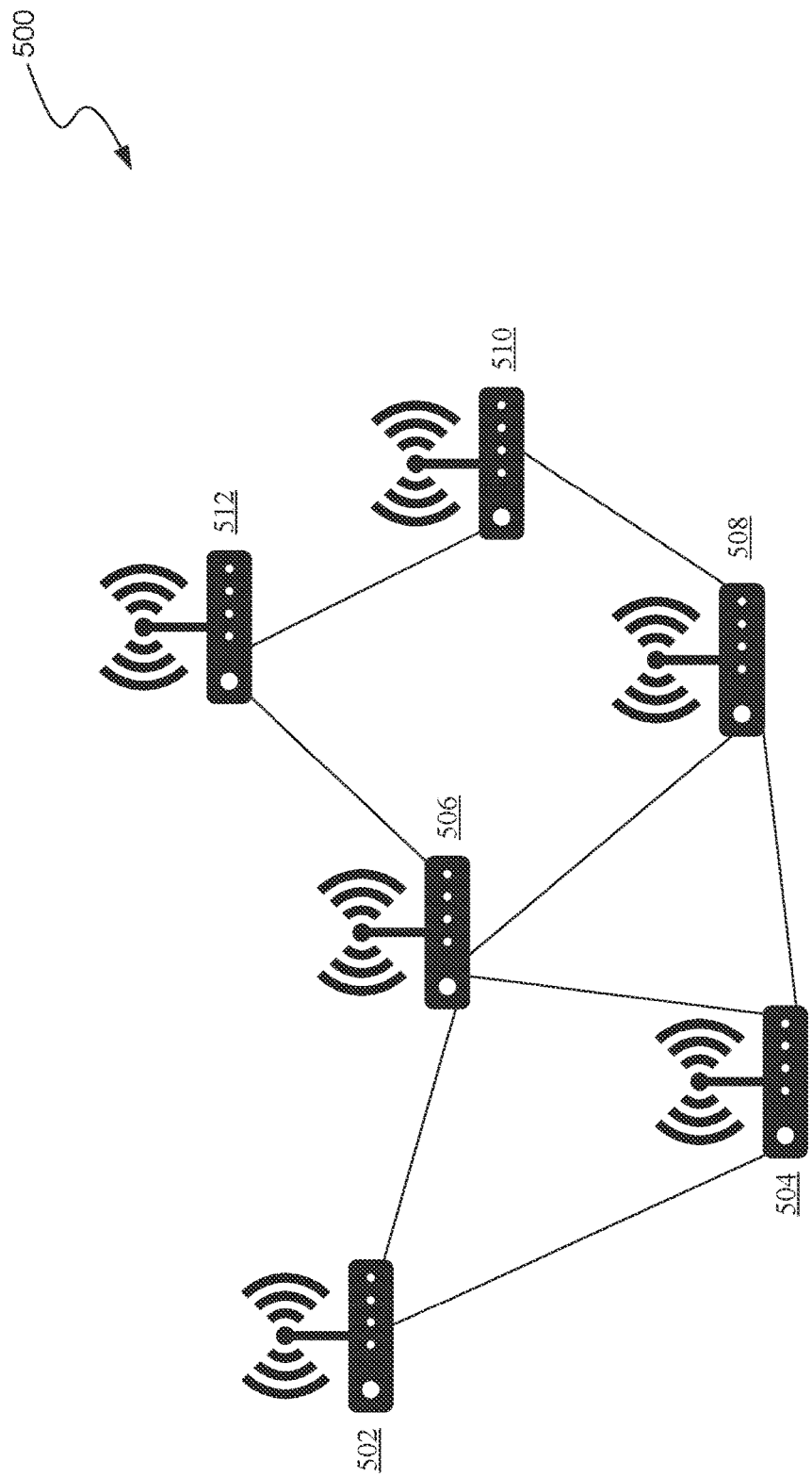
FIG. 5 illustrates an example access control network.

At block 302, process 300 detects a device that connects to the access control network. The device (e.g., set-top box, smart TV, tablet, laptop, smartphone, etc.) can be a gateway (node) in the access control network and can communicate with other devices. FIG. 5 illustrates access control network 500 in which the devices 502, 504, 506, 508, 510, and 512 are connected to form a network. Process 300 can authenticate a token associated with a device before adding the hash value to an allocation table. In some implementations, process 300 performs randomized periodic checks to identify and validate devices connected to the access control network.

At block 304, process 300 receives a request from the device (a "target device") to access media content from a media content source (e.g., internet streaming sources, cable content networks, OTA networks, satellite networks, Internet Protocol Video on Demand, electronic programming guides (EPG) data, interactive programming guide (IPG) data, etc.). The user of a target device can initiate the request with a voice command or by entering text into a user interface on a device. Process 300 can receive a token (e.g., personal access token) with an associated hash value from the device as part of the request or the device can provide the token separately. In some implementations, process 300 identifies the token associated with the device when the device connects to the access control network. The token can identify the device, the associated user of the device, a user account, and the type of media content the user is authorized to access.

At block 306, process 300 compares the requested media content to the allocation table, where the hash value is recorded in an allocation table (e.g., ledger) showing the permissions granted to that to hash value representing the device. Each device in the access control network may be configured with a particular hash value that is comprised of a private and public key, as well as a hash algorithm (e.g., SHA 256). A hash value may be generated by hashing the private and public keys of the device with the hash algorithm. The hash value may be associated with the device (E.g., set-top box, smart TV, etc.). The hash value may also be correlated with certain permissions, such as which media content the device is permitted to access. These permissions may be stored on a blockchain, where a central authority (e.g., the media content provider) and/or other devices in the access control network (e.g., other set-top boxes, smart TVs, mobile devices, etc.) can view the hash value and the permissions associated with that hash value. When a device requests to access certain media content, the request and the associated media content may be recorded in a subsequent block on the blockchain. To verify whether a device is permitted to access the requested content, a comparison must be performed between the allocation table permissions and the requested media content. If the media content is within the permissioned content, then the request may be validated, and the device may access the content. If the request is not validated because the requested content is outside of the permissioned content, then the request will be denied, and the device will not be able to access the content.

In some example aspects, other devices ("verification devices") in the access control network may perform this comparison. In some instances, the comparison may be in the form of a proof-of-work or proof-of-stake verification method. When a certain number of devices (e.g., 6) verify the requesting device's access to the media content, the requesting device may be granted access. To incentivize the other devices in the network performing this verification step, the other devices may receive a reward (e.g., tokens, reduction in monthly bill, credit to apply to future bills, upgraded service packages, etc.) from the network and/or central media content provider.

In other example aspects, a central authority may perform the comparison and perform a look-up in a database where the allocation table is stored. If the requested media falls within the permitted media content for that device, then access is granted. If the requested media falls outside the permitted media content, then the request is denied.

At block 308, process 300 determines whether the device has permission to access the request media content based on the information stored in the blockchain. If a certain number of devices (a "consensus threshold") verify the requesting device's access to the media content, then the media content will be provided to the requesting device in step 310. However, if after a certain duration of time (e.g., 30 minutes), the permission is not verified, or after a certain number of devices verify that the device does not have permission to access the requested media content, then the hash value representing the requesting device may be reported to the central media content provider.

In other embodiments, random comparisons may be initiated between the already-accessed media content of a device and the device's permissions based on the allocation table. Thus, instead of performing a verification before a device accesses media content, comparisons may be made on media content the device is currently accessing vs. what the device is permitted to access. Such comparisons may be performed on a regular basis or at random intervals. These comparisons may ensure the integrity of media content access for certain devices. For example, if a device is accessing media content that is not within its permissioned media content per the allocation table, then a comparison check may confirm that that the device is accessing media content without authorization. Such a result from the comparison check may result in the reporting of that device (and/or its associated hash value) to the central media content provider.

In step 310, a device is granted access to certain media content after a consensus of other devices deems that the requesting device has authorization to access that media content. In other variations, step 310 may be a confirmation that a device is accessing media content that is permitted by the allocation table information.

When process 300 determines that access to certain media content is not authorized or not verified, then the hash value associated with that device may be reported at step 312. As mentioned previously, a device may be accessing certain media content that it does not have permission to access. In such a scenario, other devices may perform checks to verify that the device does not have permission to access certain media content. If a consensus of devices determines that another device does not have permission to access to the media content, the hash value of the device is reported to the media content provider. Similarly, if a device is attempting to access content that the device is permitted to access, but the network is restricting access, other devices may report this at step 312, which indicates a potential error with a device in the network, where the accessible media content is less than what is permitted based on the allocation table.

Figure 4:
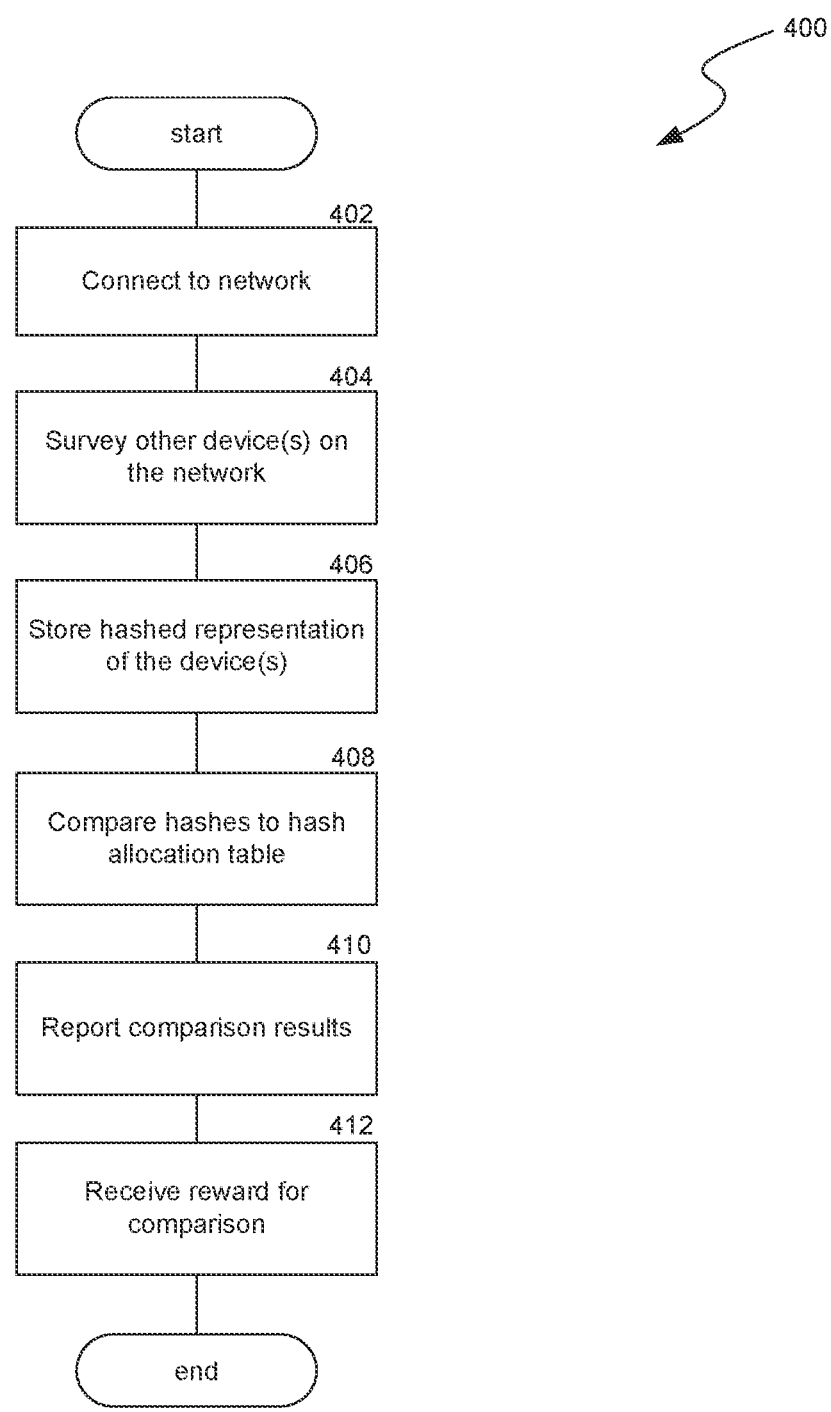
FIG. 4 is a flow diagram illustrating a process used in some implementations for controlling access to multimedia content.

FIG. 4 is a flow diagram illustrating a process 400 used in some implementations for authorizing access to multimedia content. In some implementations, process 400 is triggered by a user requesting media content (e.g., movie, TV show, song, etc.), a device connecting to an access control network, a user activating a subscription, powering on a device, a device connecting to a gateway (e.g., router), or the user downloading an authorization application on a device. In various implementations, process 400 is performed locally on the user device or performed by cloud-based device(s) that can support identifying a user device so a user can access media content.

At block 402, a device (e.g., set-top box, smart TV, etc.) connects to the access control network (e.g., 5G network). The device (e.g., set-top box, smart TV, tablet, laptop, smartphone, etc.) can be a gateway (node) in the access control network and can communicate with other devices.

At block 404, the device performs a survey of other devices connected to the access control network. The device may identify other devices in the access control network. An identifier may be, for example, a hash value that preserves the privacy of the actual identity, location, and type of device connected to the access control network.

At block 406, the device generates and stores a representation (e.g., hashed representation) of the devices in the survey. The hash value may also comprise a timestamp, indicating that a device was connected to an access control network at a particular date and time. The hash value masks personally identifiable information of the underlying device to other devices in the access control network, but the hash value can be decoded by the central media content provider, and the media content provider will be able to identify the associated device, user account, and the type of media content the user is authorized to access. A device in the access control network can run a "node" on the access control network by storing a copy of the allocation table on a block in a decentralized blockchain. The hash values of the devices can also be stored and recorded in the allocation table.

When a requesting device sends a request to access media content, at block 408, the device compares the hash value of the token associated with the requesting device to hash values of the allocation table (e.g., ledger). The device can determine whether the hash is legitimate by identifying a hash value of the device in the allocation table. In some implementations, the allocation table is stored locally in the device.

At block 410, the device generates and sends a report to the access control system regarding the comparison of the token of the requesting device. The device performing the comparison of the requesting device's hash value and the requested media content with the allocation table information may perform this comparison using a variety of techniques, such as a proof-of-work technique, where the device running the comparison may need to complete a math problem, where the hash value of the requesting device is used as an input to solving the math problem. Such a step will decrease the chances for malicious actors to hack the access control system by fallaciously verifying a device on the network. The comparison results at block 410 may be reported to a central media content provider.

At block 412, the device that performed the comparison (and proof-of-work, for example) receives a reward for performing the comparison. The reward can include a subscription discount for a media service, financial compensation (e.g., cryptocurrency, stock options, etc.), access to restricted media content, or any incentive for a user to perform the comparison operation.

FIG. 5 illustrates an example access control network. Devices 502-512 may be devices participating in the access control network 500, verifying other device's access to media content by comparing the requests/accesses to media content with a shared allocation table that shows the hash value of the device and the permitted media content associated with that hash value. Any discrepancies in these comparisons may be reported to the central media content provider.

Figure 6:
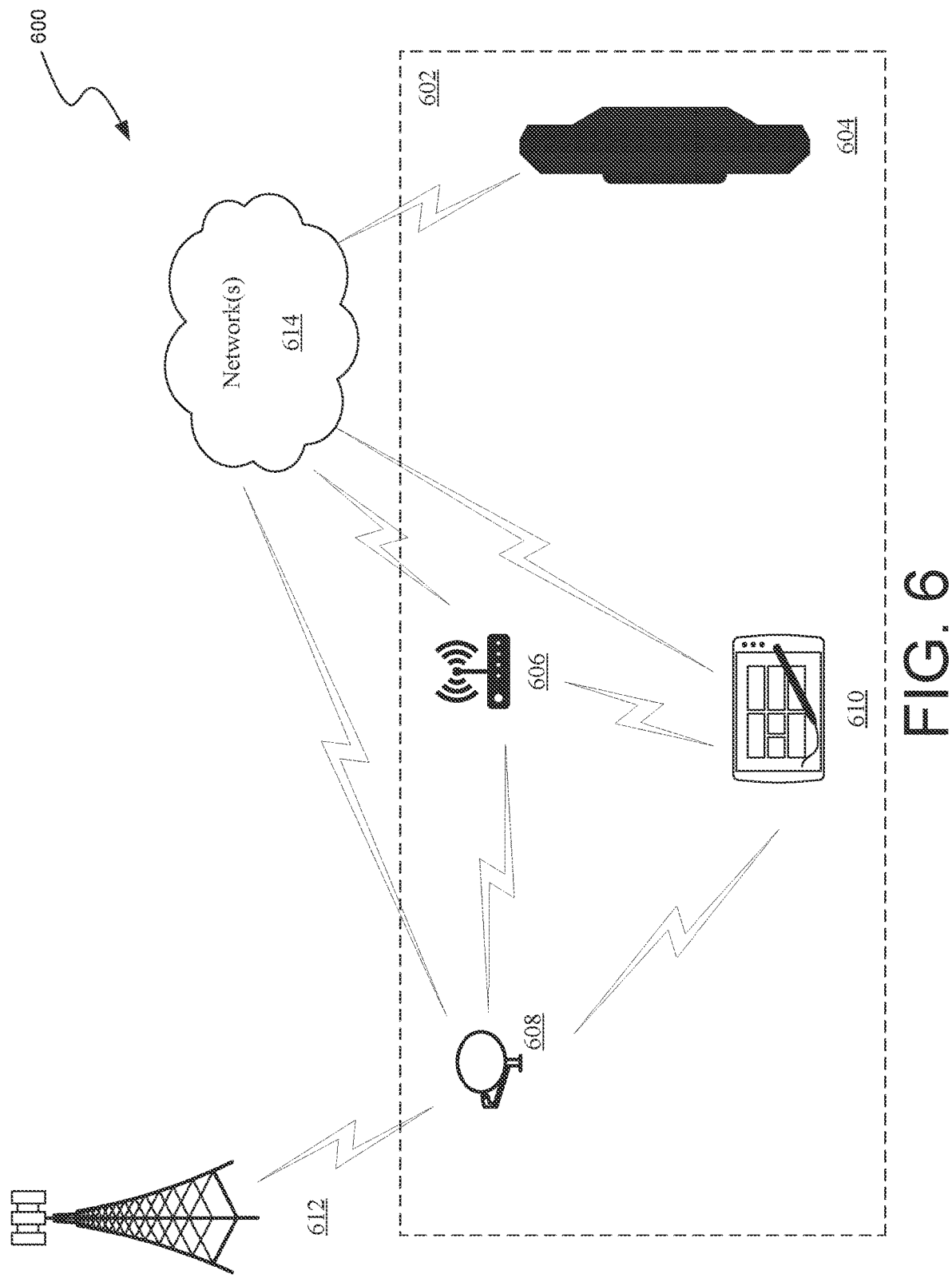
FIG. 6 illustrates an example environment of operation of the disclosed technology.

FIG. 6 illustrates an example environment of operation of the disclosed technology. In the example environment illustrated in FIG. 6, area 602 may represent a house, a commercial building, an apartment, a condo, or any other type of suitable dwelling. Inside area 602 is at least one television 604, an OTA box 606 (e.g., broadcast module box, such as a set-top box)), an OTA antenna 608, and a mobile device 610. Each of these devices may be configured to communicate with network(s) 614. OTA box 606 may be configured as a central gateway communicable with various multimedia content providers and devices, among other servers and databases housing multimedia content available for retrieval and display on user devices. Network(s) 614 may be a WiFi network and/or a cellular network. The OTA antenna 608 may also be configured to receive local broadcast signals from local broadcast tower 612 or satellite broadcast tower.

Figure 7:
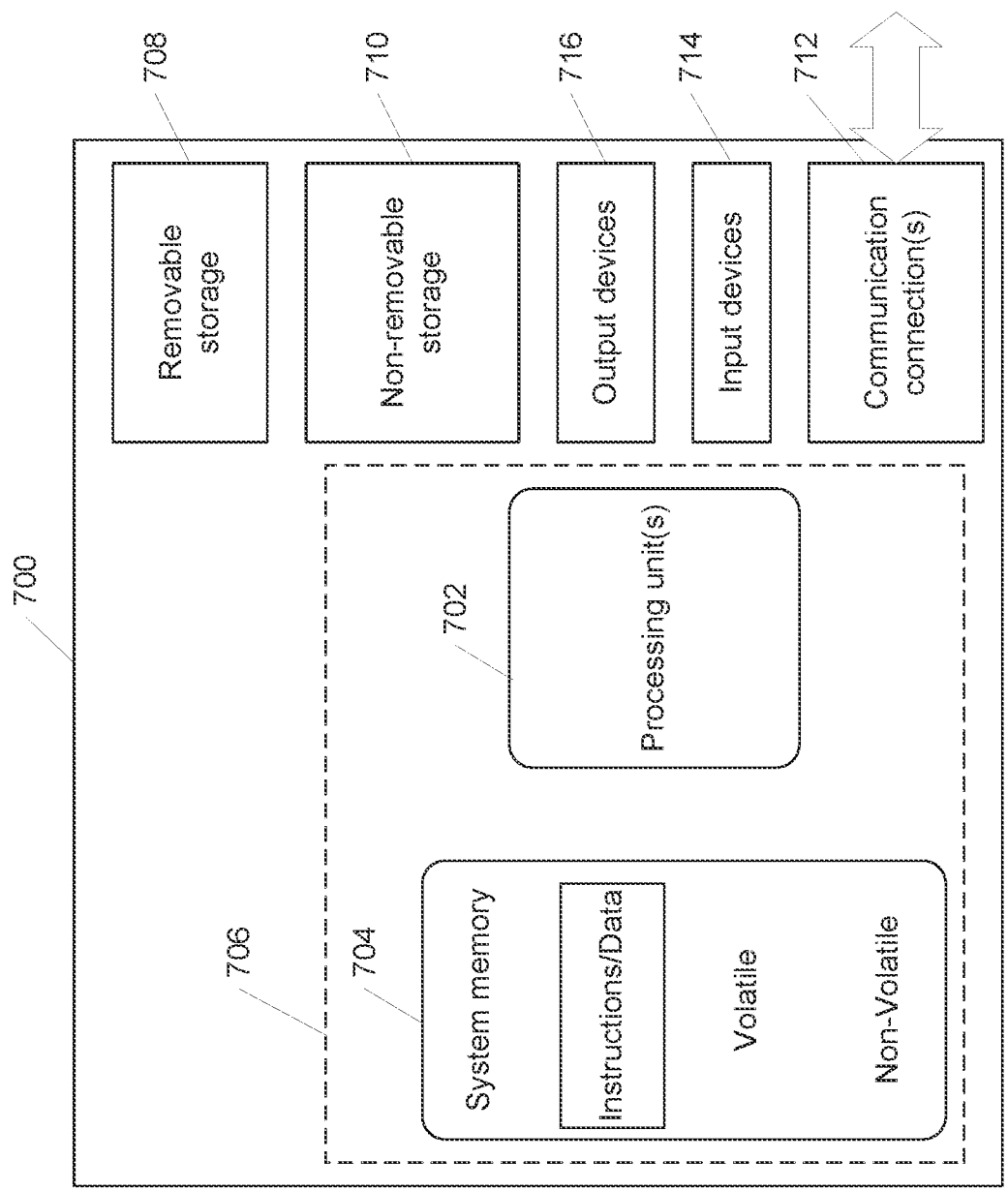
FIG. 7 illustrates one example of a suitable operating environment in which one or more of the present embodiments may be implemented.

FIG. 7 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 700 typically includes at least one processing unit 702 and memory 704. Depending on the exact configuration and type of computing device, memory 704 (storing, among other things, information related to detected devices, compression artifacts, association information, personal gateway settings, and instruction to perform the methods disclosed herein) may be volatile (such as RAM), non-volatile (such as ROM, flash memory, etc.), or some combination of the two. This most basic configuration is illustrated in FIG. 7 by dashed line 706. Further, environment 700 may also include storage devices (removable 708 and/or non-removable 710) including, but not limited to, magnetic or optical disks or tape. Similarly, environment 700 may also have input device(s) 714 such as keyboard, mouse, pen, voice input, etc., and/or output device(s) 716 such as a display, speakers, printer, etc. Also included in the environment may be one or more communication connections, 712, such as Bluetooth, WiFi, WiMax, LAN, WAN, point to point, etc.

Operating environment 700 typically includes at least some form of computer readable media. Computer readable media can be any available media that can be accessed by processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 700 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method for authorizing a target device to access multimedia content comprising:
   receiving, from the target device, a request to access the multimedia content, wherein the request to access the multimedia content is recorded on a blockchain;
   identifying a first hash value associated with the target device;
   comparing the first hash value to a second hash value in an allocation table, wherein the allocation table is stored on the blockchain and wherein the second hash value is associated with the target device;
   if the first hash value and the second hash value in the allocation table are the same, comparing the multimedia content to a multimedia content value in the allocation table, wherein the multimedia content value in the allocation table is associated with the second hash value;
   based on the comparison of the multimedia content to the multimedia content value in the allocation table, determining whether the target device has permission to access the multimedia content;
   in response to the target device not having permission to access the multimedia content, reporting the first hash value associated with the target device to at least one media content provider; and
   in response to the target device having permission to access the multimedia content, verifying the request from the target device to access the multimedia content.

2. The method of claim 1, wherein the multimedia content value in the allocation table comprises a set of multimedia content that the target device has permission to access.

3. The method of claim 2, wherein determining whether the target device has permission to access the multimedia content further comprises determining whether the multimedia content is a subset of the set of multimedia content that the target device has permission to access.

4. The method of claim 1, further comprising:
   recording the verification of the request from the target device to access the multimedia content on the blockchain; and
   in response to recording the verification on the blockchain, receiving at least one reward from a media content provider.

5. The method of claim 4, wherein the at least one reward is at least one of: a cryptocurrency, a share of stock, a coupon, a discount, an account credit, a statement credit, access to exclusive content, and an upgraded service package.

6. The method of claim 1, further comprising:
   if the first hash value and the second hash value are not the same, reporting the first hash value and the second hash value to a media content provider.

7. A computing system comprising:
   one or more processors; and
   one or more memories storing instructions that, when executed by the one or more processors, cause the computing system to perform the steps of:
   receiving, from a target device, a request to access multimedia content, wherein the request to access the multimedia content is recorded on a blockchain;
   identifying a first hash value associated with the target device;
   comparing the first hash value to a second hash value in an allocation table, wherein the allocation table is stored on the blockchain and wherein the second hash value is associated with the target device;
   if the first hash value and the second hash value in the allocation table are the same, comparing the multimedia content to a multimedia content value in the allocation table, wherein the multimedia content value is a set of multimedia content that is accessible by the target device;
   based on the comparison of the multimedia content to the multimedia content value in the allocation table, determining whether the target device has permission to access the multimedia content;
   in response to the target device not having permission to access the multimedia content, reporting the first hash value associated with the target device to at least one media content provider; and
   in response to the target device having permission to access the multimedia content, verifying the request from the target device to access the multimedia content.

8. The computing system of claim 7, wherein the steps further comprise:
   transmitting a verification message to a media content provider, wherein the verification message indicates that the target device has been verified to access the multimedia content.

9. The computing system of claim 7, wherein the target device performs a survey of at least two devices connected to an authorization platform and stores a hash representation of the at least two devices connected to the authorization platform.

10. The computing system of claim 7, wherein the first hash value and the second hash value are generated based on a private key, a public key, and at least one hashing algorithm.

11. The computing system of claim 7, wherein the steps further comprise:
    recording the verification of the request from the target device to access the multimedia content on the blockchain; and
    in response to recording the verification on the blockchain, receiving at least one reward.

12. The computing system of claim 11, wherein the at least one reward is at least one of: a cryptocurrency, a share of stock, a coupon, a discount, an account credit, a statement credit, access to exclusive content, and an upgraded service package.

13. A non-transitory computer-readable medium storing instructions that, when executed by a computing system, cause the computing system to perform operations for authorizing a target device to access multimedia content, the operations comprising:
    receiving, from the target device, a request to access the multimedia content, wherein the request to access the multimedia content is recorded on a blockchain;
    identifying a first hash value associated with the target device;
    comparing the first hash value to a second hash value in an allocation table, wherein the allocation table is stored on the blockchain and wherein the second hash value is associated with the target device;
    if the first hash value and the second hash value in the allocation table are the same, comparing the multimedia content to a multimedia content value in the allocation table, wherein the multimedia content value in the allocation table is associated with the second hash value;
    based on the comparison of the multimedia content to the multimedia content value in the allocation table, determining whether the target device has permission to access the multimedia content;

in response to the target device not having permission to access the multimedia content, reporting the first hash value associated with the target device to at least one media content provider; and in response to the target device having permission to access the multimedia content, verifying the request from the target device to access the multimedia content.

14. The non-transitory computer-readable medium of claim 13, wherein the multimedia content value in the allocation table comprises a set of multimedia content that the target device has permission to access.

15. The non-transitory computer-readable medium of claim 14, wherein determining whether the target device has permission to access the multimedia content further comprises determining whether the multimedia content is a subset of the set of multimedia content that the target device has permission to access.

16. The non-transitory computer-readable medium of claim 13, wherein the operations further comprise:

recording the verification of the request from the target device to access the multimedia content on the blockchain in response to recording the verification on the blockchain, receiving at least one reward from a media content provider.

17. The non-transitory computer-readable medium of claim 16, wherein the at least one reward is at least one of: a cryptocurrency, a share of stock, a coupon, a discount, an account credit, a statement credit, access to exclusive content, and an upgraded service package.

18. The non-transitory computer-readable medium of claim 13, wherein the operations further comprise:

if the first hash value and the second hash value are not the same, reporting the first hash value and the second hash value to a media content provider.

* * * * *